(12) United States Patent
Davies et al.

(10) Patent No.: US 12,218,812 B2
(45) Date of Patent: Feb. 4, 2025

(54) SYSTEM FOR VERIFYING CONNECTIVITY IN A TARGET COMPUTING ENVIRONMENT PRIOR TO INSTALLATION OF USER-SPECIFIC ELEMENTS

(71) Applicant: MICROSOFT TECHNOLOGY LICENSING, LLC, Redmond, WA (US)

(72) Inventors: Philip Joel Davies, Southwold (GB); Jonathan Phillips, Belfast (GB); Stephen Christopher Madden, Ferndown (GB); Andrew Chrissie Edmonds, London (GB); Steven Edward Orbell, Potters Bar (GB); Andrew McCurdy, Belfast (GB); Catherine Gallagher, Belfast (GB); Jason Dackins, Cardiff (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 624 days.

(21) Appl. No.: 17/229,835

(22) Filed: Apr. 13, 2021

(65) Prior Publication Data

US 2022/0247653 A1 Aug. 4, 2022

Related U.S. Application Data

(60) Provisional application No. 63/144,335, filed on Feb. 1, 2021.

(51) Int. Cl.
*H04L 43/0811* (2022.01)
*G06F 9/455* (2018.01)
*H04L 41/0866* (2022.01)

(52) U.S. Cl.
CPC ...... *H04L 43/0811* (2013.01); *G06F 9/45533* (2013.01); *H04L 41/0866* (2013.01)

(58) Field of Classification Search
CPC ............. H04L 43/0811; H04L 41/0866; H04L 41/0806; H04L 41/0895; H04L 41/122;
(Continued)

(56) References Cited

U.S. PATENT DOCUMENTS

2009/0313353 A1* 12/2009 Lou .................. H04L 67/06
709/219
2012/0185925 A1 7/2012 Barkie et al.
(Continued)

OTHER PUBLICATIONS

Nevot, Description of Service Instances in a Virtualised Network Environment, Jun. 2018, <https://upcommons.upc.edu/bitstream/handle/2117/128162/Degree%20Thesis_Julia%20lgual.pdf?sequence=1&isAllowed=y> (Year: 2018 ).*
(Continued)

*Primary Examiner* — Meng Ai T An
*Assistant Examiner* — Hsing Chun Lin
(74) *Attorney, Agent, or Firm* — Han Gim; Newport IP, LLC

(57) ABSTRACT

Techniques are described for verifying connectivity in a virtualized computing environment comprising networked computing devices having internal endpoints that are configured with operational connectivity to external endpoints. A connectivity test component is configured to execute as a virtual resource in the virtualized computing environment, execute protocol-aware connectivity tests that enable detection of connectivity errors between the internal endpoints and external endpoints, and instantiate or access network interfaces for establishing connectivity between the internal endpoints and external endpoints. A configuration file defines connectivity types between the internal endpoints and external endpoints. Based on the configuration file, the connectivity test component is executed in the virtualized computing environment. An output is generated by the
(Continued)

connectivity test component that is indicative of results of connectivity attempts in accordance with the configuration file.

20 Claims, 8 Drawing Sheets

(58) Field of Classification Search
CPC ..... H04L 43/20; H04L 43/50; G06F 9/45533; G06F 8/60
See application file for complete search history.

(56) References Cited

U.S. PATENT DOCUMENTS

| | | | |
|---|---|---|---|
| 2015/0312352 A1* | 10/2015 | Shamilian | H04L 67/141 |
| | | | 709/228 |
| 2016/0100325 A1 | 4/2016 | Hain | |
| 2020/0344144 A1 | 10/2020 | Lee et al. | |
| 2022/0158926 A1* | 5/2022 | Wennerström | H04W 24/06 |

OTHER PUBLICATIONS

"International Search Report and Written Opinion Issued in PCT Application No. PCT/US22/012400", Mailed Date: Apr. 4, 2022, 14 Pages.

* cited by examiner

SYSTEM FOR VERIFYING CONNECTIVITY IN A TARGET COMPUTING ENVIRONMENT PRIOR TO INSTALLATION OF USER-SPECIFIC ELEMENTS

PRIORITY APPLICATION

This application claims the benefit of and priority to U.S. Provisional Application No. 63/144,335, filed Feb. 1, 2021, the entire contents of which are incorporated herein by reference.

BACKGROUND

Service providers can provide computing services to businesses and individuals as a remote computing service or provide "software as a service" (e.g., cloud computing). In some cases, users may deploy products and services from service providers on their own premises.

When deploying resources, such as virtualized resources, in a customer computing environment, various misconfiguration issues may arise, resulting in deployment delays which in turn can prevent the customer from providing services to their downstream users. This can lead to lost revenue and customer dissatisfaction. Production loss and inefficiencies with respect to computing resources can be exacerbated when the service provider is unable to quickly isolate and correct the cause of a misconfiguration issue.

It is with respect to these considerations and others that the disclosure made herein is presented.

SUMMARY

The disclosed embodiments describe technologies for efficiently identifying configuration issues during deployment of computing resources in a new or modified customer computing environment. Such configuration issues may include connectivity issues. Deployments may include features that require connectivity with multiple endpoints within the customer's network as well as external systems.

Existing approaches to solving these issues generally involve deploying the products and services in their target environments and verifying connectivity through manual testing. When an issue is identified, the cause of the issue is investigated, and the product may be redeployed with a modified configuration. Such redeployment cycles can consume significant time and effort and lead to delays in the customer's deployment plans.

Various embodiments disclosed herein describe techniques for implementing a lightweight connectivity test component that can be initially deployed in the target environment. The lightweight connectivity test component may be configured with information pertaining to external endpoints, run protocol-aware connectivity tests to each external endpoint, and provide the results as a comprehensive report of environment readiness.

The protocol-aware connectivity tests may enable detection of connectivity errors to external components that are a common obstacle when deploying an environment of network elements.

The described techniques can allow for a service provider or customer to more efficiently deploy computing resources while maintaining efficient use of computing capacity such as processor cycles, memory, network bandwidth, and power.

This Summary is provided to introduce a selection of concepts in a simplified form that are further described below in the Detailed Description. This Summary is not intended to limit the scope of the claimed subject matter.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
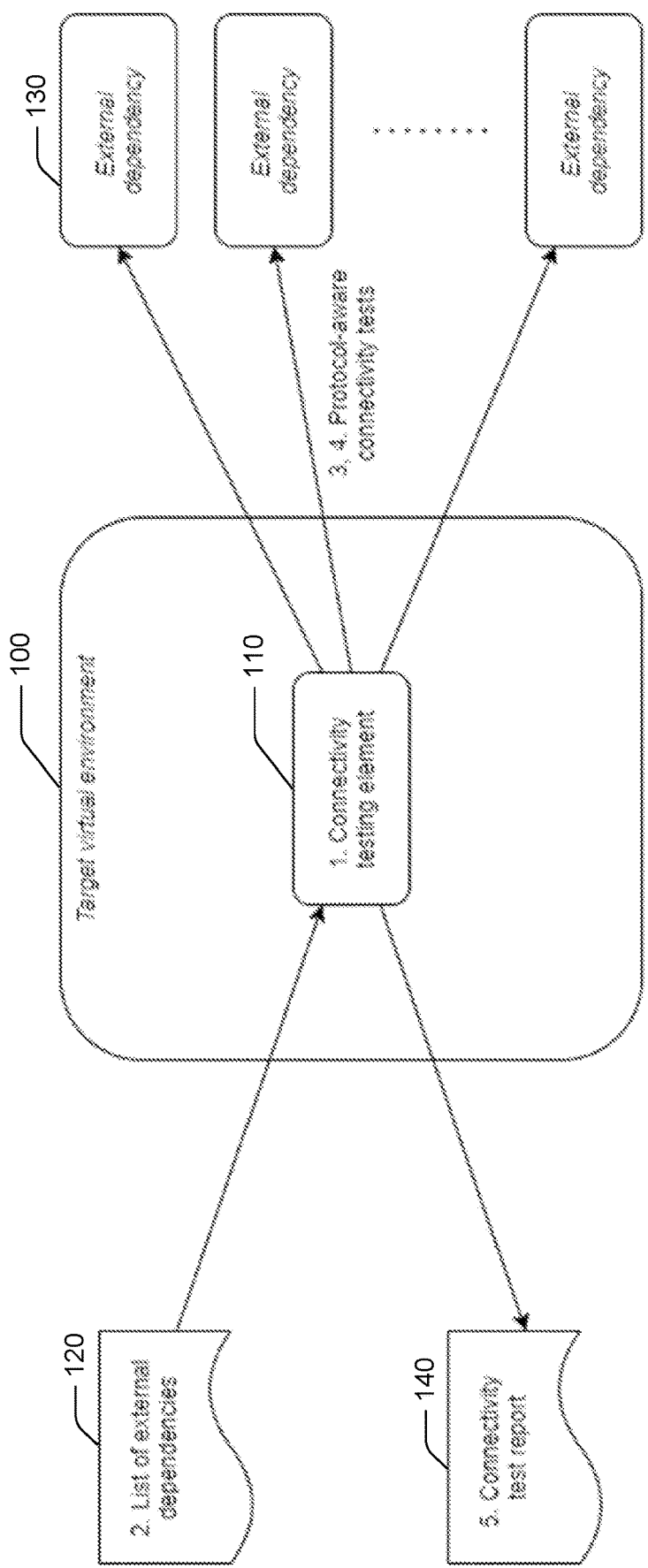
FIG. 1 is a diagram illustrating an example architecture in accordance with the present disclosure.

Many software deployments include products and services that communicate with multiple systems, within the customer's network as well as external systems. Successful deployment of these products and services requires operational connectivity to such external endpoints.

In many deployment environments, connectivity issues may be difficult to quickly troubleshoot and can have a negative impact on deployment schedules and the user experience. Troubleshooting such issues can be time consuming and labor intensive, and the service provider and/or customer can spend a considerable amount of time and effort attempting to isolate misconfiguration issues, which can lead to extensive and unnecessary consumption of computing and other resources.

Existing approaches to solving these issues generally involve deploying the products and services in their target environments and then validating connectivity to the endpoints. External connectivity issues will typically cause some tests to fail, and subsequent diagnosis activity is typically needed to identify the underlying connectivity issues which can then be fixed and the test repeated. A typical approach used to verify external dependencies is as follows.

Design documentation specifying required connectivity is agreed with the customer prior to implementation.

Connectivity is verified through manual testing of products after they have been deployed.

The products themselves include some connectivity testing and raise alarms when issues are detected.

Such deployment/test/debug iterations can be time consuming, and in some cases the issues may require that the products themselves be redeployed with a modified configuration. Corrections to external network configuration can often involve multiple parties and consume significant time and effort. In addition to the cost of such corrections, such issues can result in schedule impacts and delays. Complex rollouts with multiple stages can often benefit from certainties about when specific product deployments will be completed so that additional deployments that rely on those stages can be planned, and delays can have significant deployment impacts.

It would be desirable to find a way to quickly verify external dependencies as soon as the target environment is available, to efficiently identify problems at the earliest possible opportunity, and with a minimum of wasted effort.

The disclosed embodiments describe technologies for service providers and customer users to diagnose misconfiguration issues, particularly connectivity issues that may lead to delays in deployment of computing resources at a customer site or network. This may allow service providers and customer users to more effectively adhere to operational objectives and at the same time improve operating efficiencies.

Various embodiments disclosed herein describe techniques for implementing a lightweight connectivity test component that can be initially deployed in the target environment. The lightweight connectivity test component may be configured with information pertaining to external endpoints, run protocol-aware connectivity tests to each external endpoint, and provide the results as a comprehensive report of environment readiness.

The lightweight connectivity test component (which may be referred to herein as a connectivity test component) may be implemented based on the specific target environment to be tested. For example, if the deployment environment is an internal private cloud implementing virtual machines, then the lightweight connectivity test component may be a virtual machine. As another example, a deployment environment that includes containers may utilize a lightweight connectivity test component that is implemented as a container. Other types of components may be implemented in accordance with the deployment environment. The lightweight connectivity test component may be implemented using the minimum amount of features to facilitate efficient execution with minimal resources. For example, the lightweight connectivity test component may be implemented using the minimal amount of processors, memory, disks, and network adapters.

While the examples herein are described with reference to virtual machines, it should be understood that other embodiments may include containers or other types of components while implementing the described techniques. Furthermore, the described techniques may be implemented in any environment that includes network-connected software.

In some embodiments, the present disclosure may be implemented in a mobile edge computing (MEK) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

The lightweight connectivity test component may execute protocol-aware connectivity tests that enable detection of connectivity errors to external components that are a common obstacle when deploying an environment of network elements. Examples of such connectivity errors include:
Firewall misconfiguration
Security group misconfiguration
Malfunctioning external components
Incorrect information about external components (e.g., a mistyped IP address)

The connectivity test component may be implemented as a virtual machine, container, or other suitable component, and may be deployed in the target environment prior to deployment of other elements. The connectivity test component may be configured with network connectivity on all networks available to the target environment. For example, if the connectivity test component is a virtual machine, the virtual machine may be configured with the necessary network interfaces, such as virtual network interface cards (vNICs) to have a presence on each network that the connectivity test component needs to reach.

The connectivity test component may be configured with details of remote elements which are to be accessible from the target environment, and which networks they are to be accessible from. In an embodiment, the details may be provided via a configuration file with a machine-readable format which may be automatically generated from existing documentation prior to use of the connectivity test component. For example, a configuration file that defines the endpoints and connectivity types may be provided to the connectivity test component.

The connectivity test component may be invoked, for example, by executing a command in a terminal session. In response, the connectivity test component may attempt to connect to all configured remote elements from the relevant networks, based on the configuration file. In a virtual machine implementation, the connectivity test component may include an application that accesses the configuration file and executes a series of operations to test each element described in the configuration file.

In an embodiment, the connectivity testing performed by the connectivity test component may be protocol aware. For example, a Domain Name System (DNS) server listed in the remote element configuration data may be tested by sending a DNS query to the configured port and waiting for a response, rather than (for example) an Internet Control Message Protocol (ICMP) ping. Other examples of testing with the relevant protocols include:
Network Time Protocol (NTP)
Diameter
Session Initiation Protocol (SIP)
Mutual Transport Layer Security (TLS) authentication
Hypertext Transfer Protocol Secure (HTTPS)

For example, the connectivity test component may verify that configured NTP server(s) can be reached and used, or verify that required DNS domains can be resolved.

In addition to confirming a valid reply to a valid request, the connectivity test component may further verify that a valid reply is received in a timely manner. Such testing may be useful in cases where, for example, a network element to be deployed at a later time may require that a remote endpoint responds within a specified time. More generally, the connectivity test component may verify that responses are received in accordance with documented statements of performance or capacity which require timely responses within a specified threshold.

In an embodiment, the connectivity test component may be configured to verify the reachability of each defined interconnection peer, and may include one or more of the following functions:

IP Connectivity Tester
   Inputs: peer IP address & port, local IP address
   Test IP connectivity
   Return result & pcap trace file
IP Connectivity Tester
   Inputs: application specific IP connectivity requirements
   Test IP connectivity
   Return result & pcap trace file
DNS Tester
   Inputs: DNS domains to be checked and IPs of DNS servers
   Verify that domains can be resolved
   Return result & pcap trace file
Diameter Tester
   Inputs: Diameter peer/realm, IP/port (local and remote)
   Verify that Diameter peers are reachable and functional at a Diameter level
   Return result & pcap trace file
TLS Tester
   Inputs: LI X2/3 IPs, TLS certificates
   Verify TLS handshake
   Return result & pcap trace file In some embodiments, a single IP address may be used to verify connectivity to one or more session border controller (SBC) nodes.

In some embodiments, the connectivity test component may be assigned a local IP address in each network for testing. The local IPs may be taken from a site descriptor record of IP addresses per site.

In some embodiments, additional input parameters may be provided to the connectivity test component to run a subset of the tests.

The connectivity test component may be configured to generate a test report or other output containing results of all connectivity attempts, in a format (for example CSV) that may be read directly or imported into downstream reporting or auditing tools. In some embodiments, the results may also be in the form of .pcap trace files.

The output may thus identify misconfigurations which may otherwise be discovered late in the process of onboarding a target environment, after network elements are deployed and configured and fail to operate as expected. By introducing a lightweight connectivity test component that can be deployed before the other elements in the target environment, external connectivity can be validated earlier, in a single pass, and with reduced effort. This may reduce the overall time required to complete the commissioning process and increasing certainty in multi-stage deployments. Additionally, the lightweight connectivity test component may allow for the focused testing of connectivity requirements for the deployed system by explicitly testing and verifying the connectivity requirements. This can provide more efficient and direct identification of connectivity issues rather than previous methods where connectivity issues were indirectly raised due to issues with applications and other components that use the connectivity features. For example, in a scenario where virtual network functions (VNFs) are deployed in a virtualized environment in a customer network, operation of a VNF may include reaching an endpoint that, if there is a connectivity issue, may generate an error message which would lead to troubleshooting efforts to identify the connectivity issue. The lightweight connectivity test component is configured to test specific connectivity functions such that connectivity issues can be identified before full deployment, thus saving significant time and effort.

Additionally, while the described examples include new deployments, the described lightweight connectivity test component may be utilized when only a portion of the target environment has changed, for example if a new component is added to the network or if an existing component is upgraded. The lightweight connectivity test component can be executed with minimal resources to verify that expected connectivity was not impacted by the change.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples. While many examples are described using servers and disks, it should be understood that other types of compute nodes and storage devices may be used in other embodiments.

Examples of the steps and components described above are illustrated with reference to FIG. 1. The connectivity test element or component 110, which may be, for example, a virtual machine, may be deployed in the target environment 100 before other elements or components are deployed. The connectivity test element or component 110 may be created with network connectivity on all networks available to the target environment 100. The connectivity test element or component 110 may be configured with details of external dependencies 120 which must be accessible from the target environment, and which networks they must be accessible from. The configuration format may be human- and machine-readable format which may be automatically generated from existing documentation prior to use of the connectivity test element or component 110.

The connectivity test element or component 110 may be invoked (for example by running a command in a terminal session) and it may attempt to connect to all external dependencies 130 (e.g., configured remote elements) from the relevant networks.

The connectivity testing implemented by the connectivity test element or component 110 may be protocol aware in view of the external dependencies 130. For example, a DNS server listed in the remote element configuration data may be tested by sending a DNS query to the configured port and waiting for a response, rather than (for example) an ICMP ping.

The connectivity test element or component 110 may generate a connectivity test report 140 containing results of the connectivity attempts. The connectivity test report 140 may be generated in a format (for example, CSV) that may be read directly or imported into downstream reporting or auditing tools.

Figure 2:
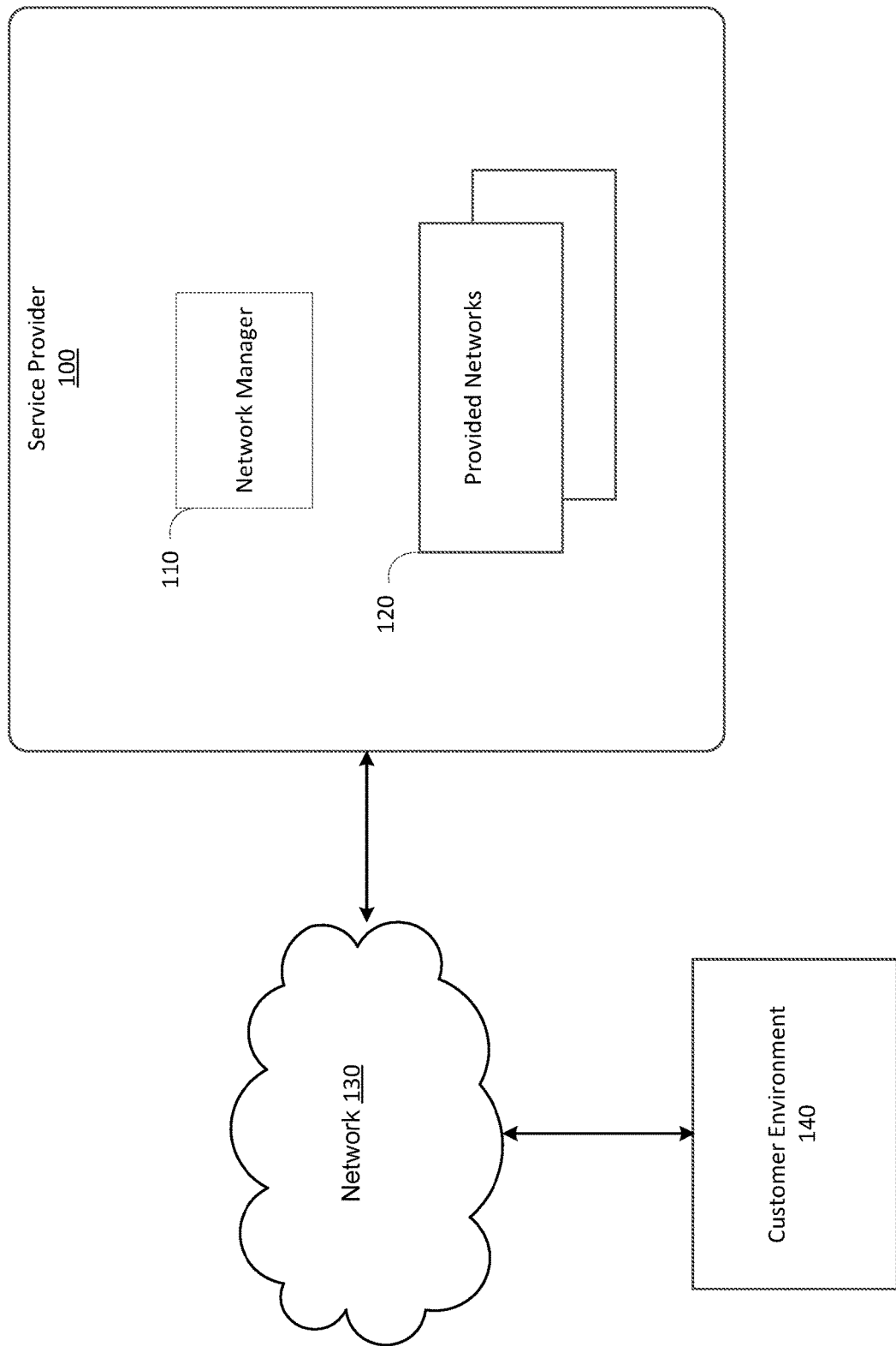
FIG. 2 is a diagram illustrating an example architecture in accordance with the present disclosure.

FIG. 2 illustrates an example computing environment in which the embodiments described herein may be implemented. FIG. 2 illustrates a service provider 100 that is configured to provide computing resources to users at customer environment 140. The customer environment 140 may have user computers that may access services provided by service provider 100 via a network 130. The computing resources provided by the service provider 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like.

Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor). Networking resources may include virtual networking, software load balancer, and the like. The virtual machines may be configured to execute applications, including Web servers, application servers, media servers, database servers, and the like. Data storage resources may include file storage devices, block storage devices, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the customer environment 140.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

It should be appreciated that although the embodiments disclosed above are discussed in the context of virtual machines, other types of implementations can be utilized with the concepts and technologies disclosed herein. It should be also appreciated that the network topology illustrated in FIG. 2 has been greatly simplified and that many more networks and networking devices may be utilized to interconnect the various computing systems disclosed herein. These network topologies and devices should be apparent to those skilled in the art.

Figure 3:
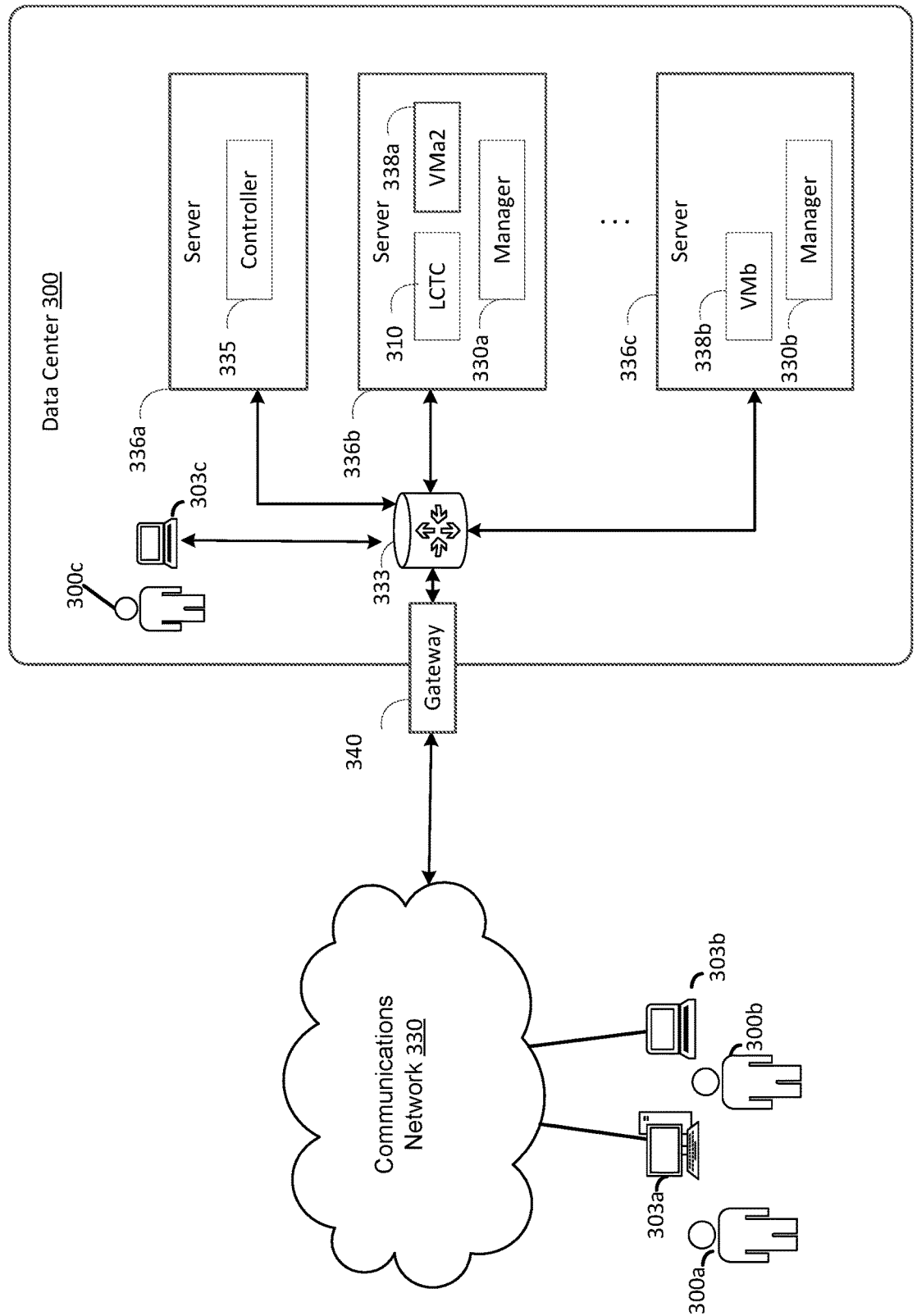
FIG. 3 is a diagram illustrating an example architecture in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to data center 100 and 110 of FIG. 2. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

In an embodiment, a lightweight connectivity test component (LCTC) 310 as described herein may be implemented in server 336b.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a, 303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
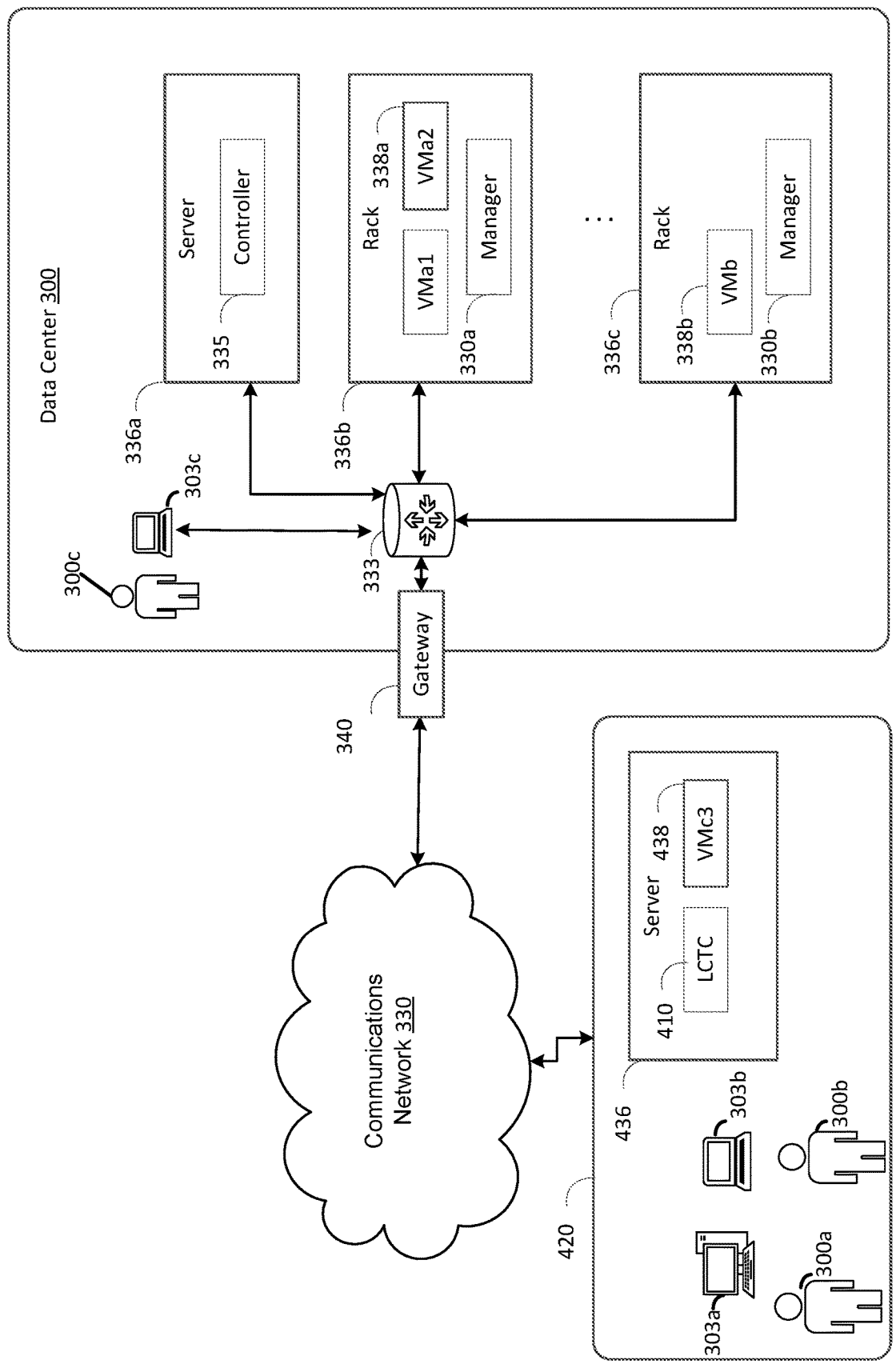
FIG. 4 is a diagram illustrating an example architecture in accordance with the present disclosure.

FIG. 4 illustrates an example computing environment illustrating connectivity testing at deployment site 420, in accordance with the present disclosure. In one embodiment, one or more servers 436 may be installed at the edge site 420. In an embodiment, servers 436 instantiate and run virtual machines 438. In an embodiment, a lightweight connectivity test component (LCTC) 410 as described herein may be implemented in server 436.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5:
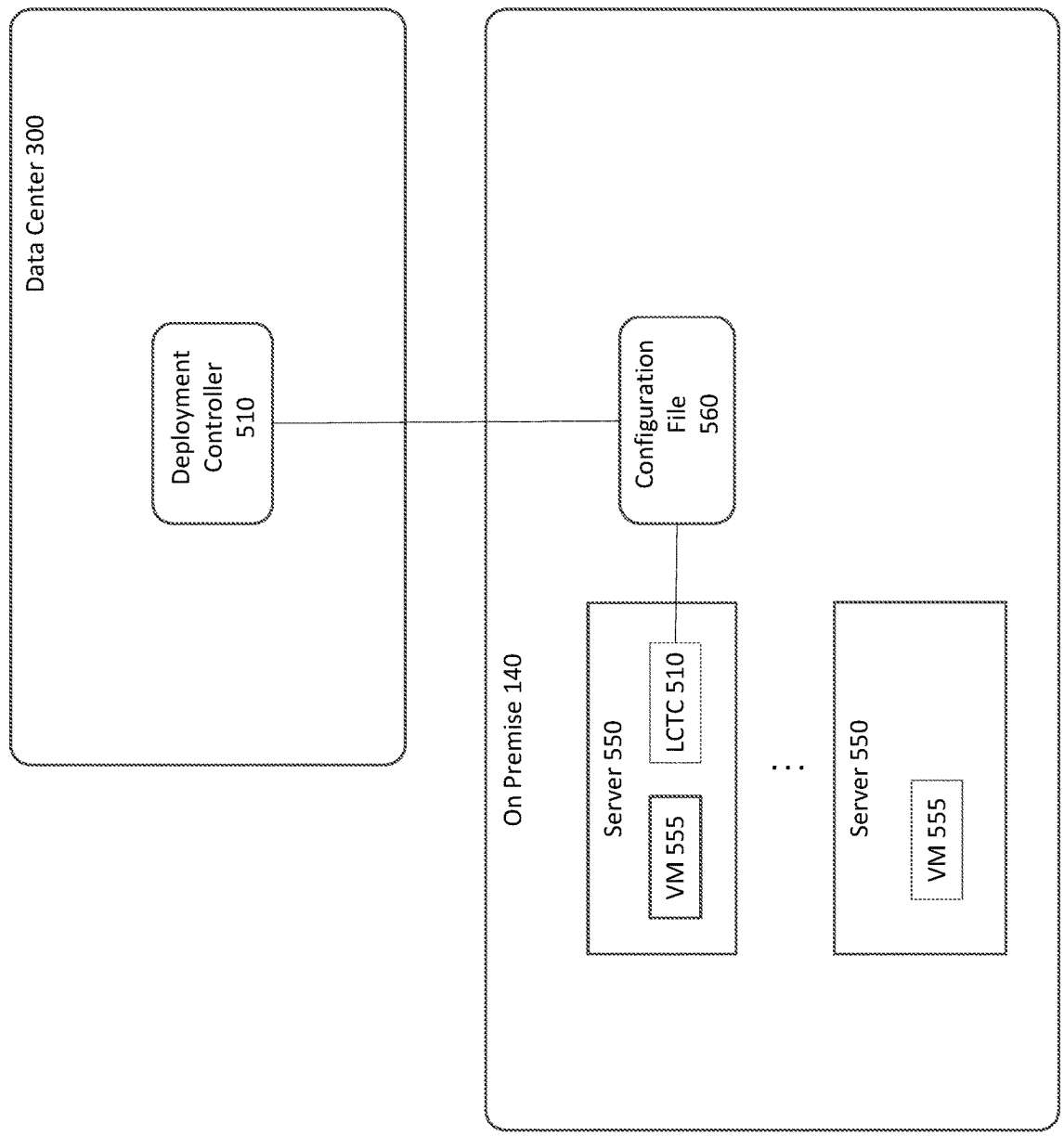
FIG. 5 is a diagram illustrating an example architecture in accordance with the present disclosure.

With reference to FIG. 5, illustrated is one example architecture for providing connectivity testing. In an embodiment, the architecture may include a deployment controller 510. In some embodiments, the deployment controller 510 may be configured to provide a centralized point of automated control to manage, configure, monitor, and troubleshoot virtual and physical network infrastructure at the customer deployment environment 140. The deployment controller 510 may enable automatic configuration of and execution of lightweight connectivity test component (LCTC) 510.

The architecture may further provide a configuration file 560 as further described herein, which may be configured to identify connectivity and endpoints for verification by LCTC 510.

Figure 6A:
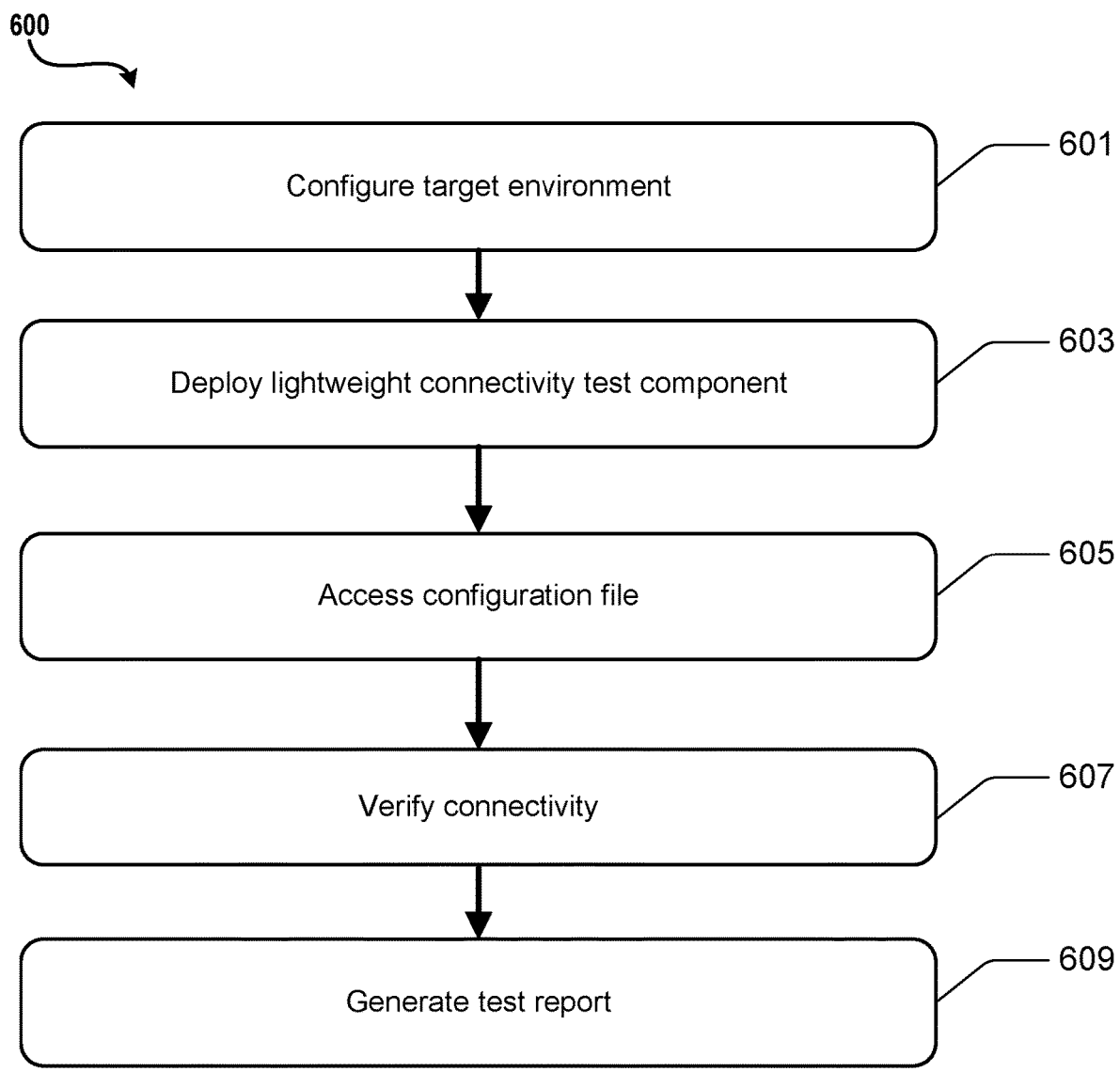
FIG. 6A is a flowchart depicting an example procedure for managing computing resources in accordance with the present disclosure.

Turning now to FIG. 6A, illustrated is an example operational procedure for providing connectivity testing in accordance with the present disclosure. In an embodiment, the computing environment comprises a computing service provider and a remote computing network.

Referring to FIG. 6A, operation 601 illustrates configuring the target environment. Operation 601 may be followed by operation 603. Operation 603 illustrates deploying a lightweight connectivity test component. Operation 603 may be followed by operation 605. Operation 605 illustrates accessing a configuration file. Operation 605 may be followed by operation 607. Operation 607 illustrates verifying connectivity in accordance with the configuration file. Operation 607 may be followed by operation 609. Operation 609 illustrates generating a test report based on the connectivity tests.

Figure 6B:
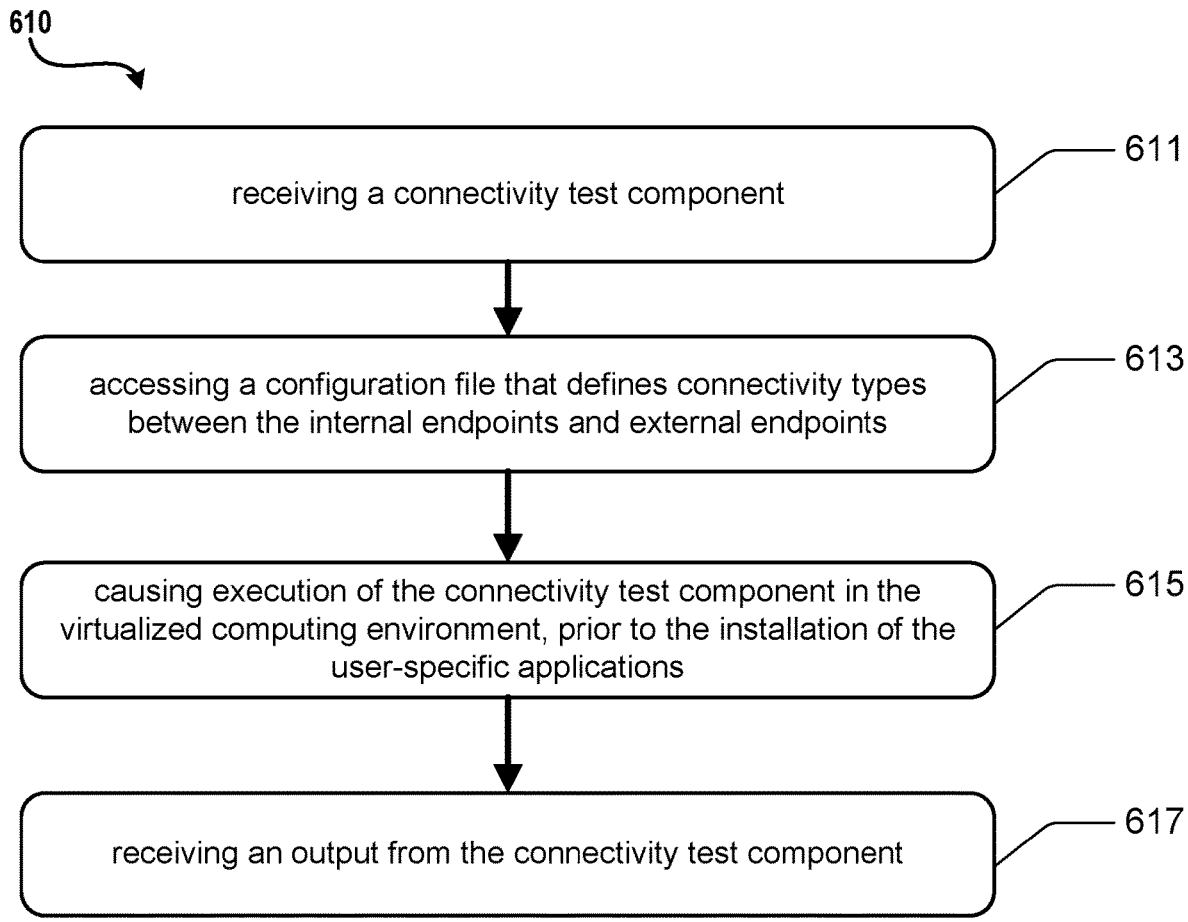
FIG. 6B is a flowchart depicting an example procedure for managing computing resources in accordance with the present disclosure.

Turning now to FIG. 6B, illustrated is an example operational procedure for verifying connectivity in a virtualized computing environment comprising networked computing devices having internal endpoints that are configured with operational connectivity to external endpoints for a user-specific configuration. Such an operational procedure can be provided by one or more components illustrated in FIGS. 1 through 5. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 6B, operation 611 illustrates receiving a connectivity test component. In an embodiment, the connectivity test component is configured to execute as a virtual resource in the virtualized computing environment, prior to installation of user-specific applications in the virtualized computing environment. In an embodiment, the connectivity test component is configured to execute protocol-aware connectivity tests that enable detection of connectivity errors between the internal endpoints and external endpoints. In an embodiment, the connectivity test component is configured to instantiate or access network interfaces for establishing connectivity between the internal endpoints and external endpoints Operation 611 may be followed by operation 613. Operation 613 illustrates accessing a configuration file that defines connectivity types between the internal endpoints and external endpoints.

Operation 613 may be followed by operation 615. Operation 615 illustrates based on the configuration file, causing execution of the connectivity test component in the virtualized computing environment, prior to the installation of the user-specific applications.

Operation 615 may be followed by operation 617. Operation 617 illustrates receiving an output from the connectivity test component, the output indicative of results of connectivity attempts in accordance with the configuration file.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
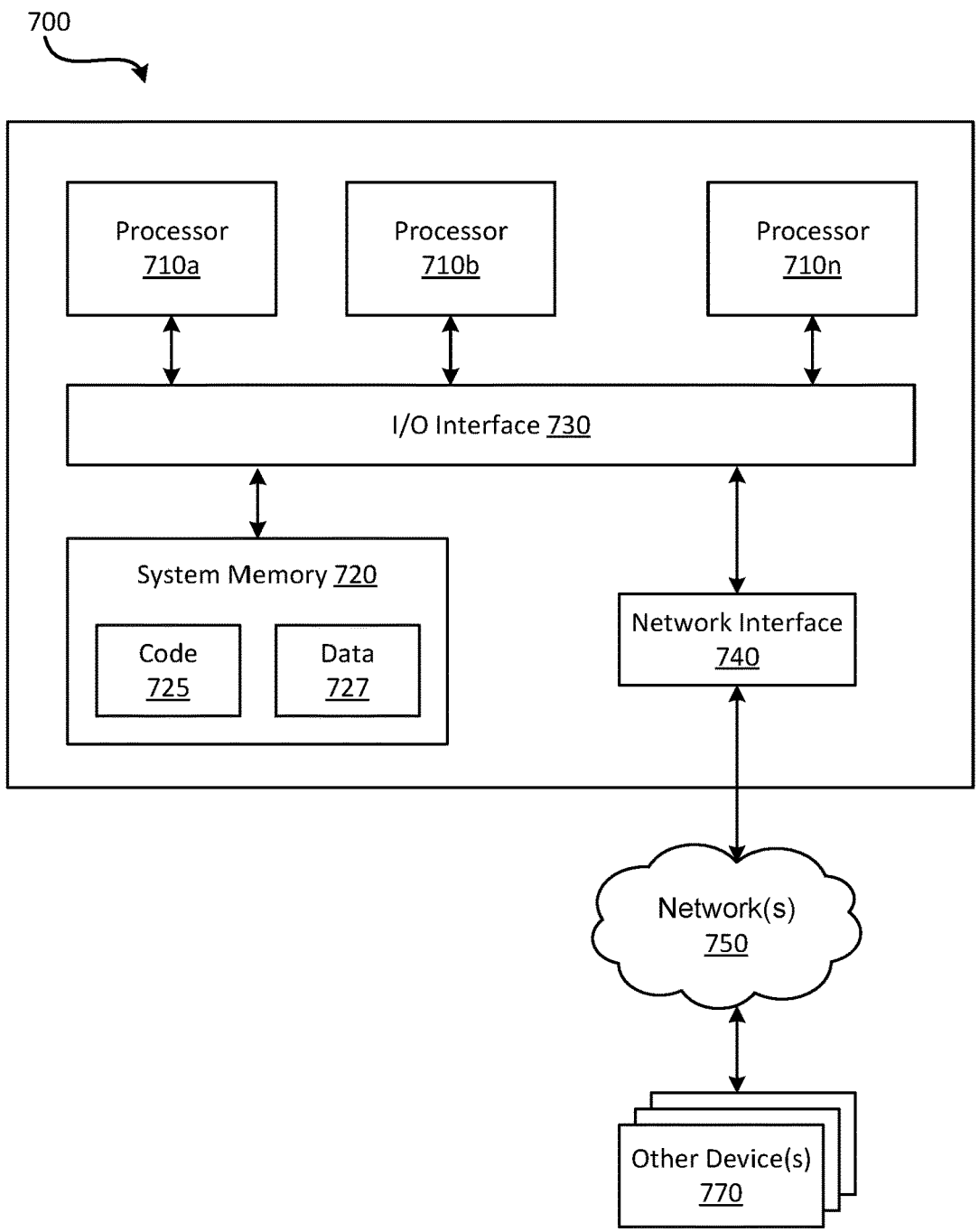
FIG. 7 is an example computing system in accordance with the present disclosure.

FIG. 7 illustrates a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 750, such as other computer systems or devices as illustrated in FIGS. 1 through 5, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for verifying connectivity in a virtualized computing environment comprising networked computing devices having internal endpoints that are configured with operational connectivity to external endpoints for a user-specific configuration, the method comprising:
receiving a connectivity test component configured to:
execute as a virtual resource in the virtualized computing environment, prior to installation of user-specific applications in the virtualized computing environment;
execute protocol-aware connectivity tests that enable detection of connectivity errors between the internal endpoints and external endpoints; and
instantiate or access network interfaces for establishing connectivity between the internal endpoints and external endpoints;
accessing a configuration file that defines connectivity types between the internal endpoints and external endpoints;
based on the configuration file, causing execution of the connectivity test component in the virtualized computing environment, prior to the installation of the user-specific applications; and
receiving an output from the connectivity test component, the output indicative of results of connectivity attempts in accordance with the configuration file.

Clause 2: The method of clause 1, wherein the virtual resource is a virtual machine or a container.

Clause 3: The method of any of clauses 1-2, wherein the virtual machine or a container is configured with a minimal amount of resources needed to execute in the virtualized computing environment.

Clause 4: The method of any of clauses 1-3, wherein the connectivity errors include one or more of a firewall misconfiguration, security group misconfiguration, malfunctioning external components, or incorrect information about external components.

Clause 5: The method of any of clauses 1-4, wherein the network interfaces comprise virtual network interface cards.

Clause 6: The method of any of clauses 1-5, wherein the connectivity test component comprises an application configured to access the configuration file and execute one or more operations to test each element described in the configuration file.

Clause 7: The method of clauses 1-6, wherein the protocol-aware connectivity tests comprise one or more of DNS, NTP, Diameter, SIP, TLS, or HTTPS.

Clause 8: The method of any of clauses 1-7, further comprising generating a notification to postpone installation of the user-specific applications in response to the output indicating a failed connectivity attempt.

Clause 9: A system, comprising:
one or more processors; and
a memory in communication with the one or more processors, the memory having computer-readable instructions stored thereupon that, when executed by the one or more processors, cause the system to perform operations comprising:
generate a connectivity test component configured to:
execute as a computing resource in a target computing environment comprising networked computing devices having with internal endpoints that are configured with operational connectivity to external endpoints;

execute protocol-aware connectivity tests that enable detection of connectivity errors between the internal endpoints and external endpoints; and instantiate or access network interfaces for establishing connectivity between the internal endpoints and external endpoints;

generate a configuration file that defines connectivity types between the internal endpoints and external endpoints;

send the connectivity test component and configuration file to the target computing environment;

causing execution of the connectivity test component in the target computing environment, the connectivity test component executed using the configuration file; and receiving an output from the connectivity test component, the output indicative of results of connectivity attempts in accordance with the configuration file.

Clause 10: The system of clause 9, wherein the target computing environment is a virtualized computing environment and the computing resource is a virtual machine or container.

Clause 11: The system of any of clauses 9 and 10, wherein the connectivity errors include one or more of a firewall misconfiguration, security group misconfiguration, malfunctioning external components, or incorrect information about external components.

Clause 12: The system of any clauses 9-11, wherein the connectivity test component comprises an application configured to access the configuration file and execute one or more operations to test each element described in the configuration file.

Clause 13: The system of any clauses 9-12, wherein the protocol-aware connectivity tests comprise one or more of DNS, NTP, Diameter, SIP, TLS, or HTTPS.

Clause 14: The system of any clauses 9-13, wherein the connectivity test component is configured to verify that a valid reply is received in a timely manner.

Clause 15: The system of any clauses 9-14, wherein the virtual machine or a container is configured with a minimal amount of resources needed to execute in the virtualized computing environment.

Clause 16: The system of any clauses 9-15, wherein the configuration file is generated based on data indicative of the target computing environment and one or more user requirements.

Clause 17: A computer-readable storage medium having computer-executable instructions stored thereupon which, when executed by one or more processors of a computing device, cause the computing device to:

instantiate a connectivity test component configured to:

execute as a virtual resource in a virtualized computing environment comprising networked computing devices having with internal endpoints that are configured with operational connectivity to external endpoints;

execute protocol-aware connectivity tests that enable detection of connectivity errors between the internal endpoints and external endpoints; and instantiate or access network interfaces for establishing connectivity between the internal endpoints and external endpoints;

access a configuration file that defines connectivity types between the internal endpoints and external endpoints;

based on the configuration file, execute the connectivity test component in the virtualized computing environment; and generate an output indicative of results of connectivity attempts in accordance with the configuration file.

Clause 18: The computer-readable storage medium of clause 17, wherein the connectivity errors include one or more of a firewall misconfiguration, security group misconfiguration, malfunctioning external components, or incorrect information about external components.

Clause 19: The computer-readable storage medium of any of clauses 17 and 18, wherein the connectivity test component comprises an application configured to access the configuration file and execute one or more operations to test each element described in the configuration file.

Clause 20: The computer-readable storage medium of any of the clauses 17-19, wherein the protocol-aware connectivity tests comprise one or more of DNS, NTP, Diameter, SIP, TLS, or HTTPS.

The invention claimed is:

1. A method for verifying connectivity in a target virtualized computing environment comprising networked computing devices having internal endpoints of the target virtualized computing environment that are configured to have operational connectivity to external endpoints for a user-specific configuration, the external endpoints being remote from the target virtualized computing environment, the verifying of the connectivity performed in the target virtualized computing environment in a pre-operational configuration prior to operational deployment of the user-specific configuration in the target virtualized computing environment, the method comprising:

receiving, at the target virtualized computing environment, a connectivity test component configured to:

execute as a virtual resource in the target virtualized computing environment, prior to installation of user-specific elements in the target virtualized computing environment;

execute protocol-aware connectivity tests that enable detection of connectivity errors between the internal endpoints of the target virtualized computing environment and the external endpoints;

instantiate or access network interfaces for establishing connectivity between the internal endpoints of the target virtualized computing environment and the external endpoints;

verify that responses from the external endpoints are received in accordance with documented statements of performance or capacity which require timely responses within a specified threshold; and verify reachability of defined interconnection peers based on the defined interconnection peers' IP addresses and ports;

accessing a configuration file that defines connectivity types between the internal endpoints of the target virtualized computing environment and the external endpoints that are remote from the target virtualized computing environment;

based on the configuration file, causing execution of the connectivity test component in the target virtualized computing environment, prior to the installation of the user-specific elements; and receiving an output from the connectivity test component, the output indicative of results of connectivity attempts in accordance with the configuration file.

2. The method of claim 1, wherein the virtual resource is a virtual machine or a container.

3. The method of claim 2, wherein the virtual machine or the container is configured with a minimal amount of resources needed to execute in the target virtualized computing environment.

4. The method of claim 1, wherein the connectivity errors include one or more of a firewall misconfiguration, security group misconfiguration, malfunctioning external components, or incorrect information about the external components.

5. The method of claim 1, wherein the network interfaces comprise virtual network interface cards.

6. The method of claim 1, wherein the connectivity test component comprises an application configured to access the configuration file and execute one or more operations to test each element described in the configuration file.

7. The method of claim 1, wherein the protocol-aware connectivity tests comprise one or more of DNS, NTP, Diameter, SIP, TLS, or HTTPS.

8. The method of claim 1, further comprising generating a notification to postpone installation of the user-specific elements in response to the output indicating a failed connectivity attempt.

9. A system comprising:
one or more processors; and
a memory in communication with the one or more processors, the memory having computer-readable instructions stored thereupon that, when executed by the one or more processors, cause the system to perform operations comprising:
generate a connectivity test component configured to:
execute as a computing resource in a target computing environment comprising networked computing devices having with internal endpoints of the target computing environment that are configured with operational connectivity to external endpoints, the external endpoints being remote from the target computing environment, the connectivity test component executed in the target computing environment prior to deployment of a user-specific configuration in the target computing environment and prior to installation of user-specific elements in the target computing environment;
execute protocol-aware connectivity tests that enable detection of connectivity errors between the internal endpoints of the target computing environment and the external endpoints;
instantiate or access network interfaces for establishing connectivity between the internal endpoints of the target computing environment and the external endpoints;
verify that responses from the external endpoints are received in accordance with documented statements of performance or capacity which require timely responses within a specified threshold; and
verify reachability of defined interconnection peers based on the defined interconnection peers' IP addresses and ports;
generate a configuration file that defines connectivity types between the internal endpoints of the target computing environment and the external endpoints that are remote from the target computing environment;
send the connectivity test component and the configuration file to the target computing environment;
causing execution of the connectivity test component in the target computing environment, the connectivity test component executed using the configuration file; and
receiving an output from the connectivity test component, the output indicative of results of connectivity attempts in accordance with the configuration file.

10. The system of claim 9, wherein the target computing environment is a virtualized computing environment and the computing resource is a virtual machine or container.

11. The system of claim 9, wherein the connectivity errors include one or more of a firewall misconfiguration, security group misconfiguration, malfunctioning external components, or incorrect information about the external components.

12. The system of claim 9, wherein the connectivity test component comprises an application configured to access the configuration file and execute one or more operations to test each element described in the configuration file.

13. The system of claim 9, wherein the protocol-aware connectivity tests comprise one or more of DNS, NTP, Diameter, SIP, TLS, or HTTPS.

14. The system of claim 9, wherein the connectivity test component is configured to verify that a valid reply is received in a timely manner.

15. The system of claim 10, wherein the virtual machine or the container is configured with a minimal amount of resources needed to execute in the virtualized computing environment.

16. The system of claim 15, wherein the configuration file is generated based on data indicative of the target computing environment and one or more user requirements.

17. A computer-readable storage medium having computer-executable instructions stored thereupon which, when executed by one or more processors of a system, cause the system to:
instantiate a connectivity test component configured to:
execute as a virtual resource in a 5G network comprising networked computing devices having internal endpoints of the 5G network that are configured with operational connectivity to external endpoints, the external endpoints being remote from the 5G network, the connectivity test component executed in the 5G network prior to deployment of a user-specific configuration in the 5G network and prior to installation of user-specific elements in the 5G network;
execute protocol-aware connectivity tests that enable detection of connectivity errors between the internal endpoints of the 5G network and the external endpoints;
instantiate or access network interfaces for establishing connectivity between the internal endpoints of the 5G network and the external endpoints;
verify that responses from the external endpoints are received in accordance with documented statements of performance or capacity which require timely responses within a specified threshold; and
verify reachability of defined interconnection peers based on the defined interconnection peers' IP addresses and ports;
access a configuration file that defines connectivity types between the internal endpoints of the 5G network and the external endpoints;
based on the configuration file, execute the connectivity test component in the 5G network; and
generate an output indicative of results of connectivity attempts in accordance with the configuration file.

18. The computer-readable storage medium of claim 17, wherein the connectivity errors include one or more of a firewall misconfiguration, security group misconfiguration, malfunctioning external components, or incorrect information about the external components.

19. The computer-readable storage medium of claim 17, wherein the connectivity test component comprises an application configured to access the configuration file and execute one or more operations to test each element described in the configuration file.

20. The computer-readable storage medium of claim 17, wherein the protocol-aware connectivity tests comprise one or more of DNS, NTP, Diameter, SIP, TLS, or HTTPS.

\* \* \* \* \*